Sept. 2, 1947.  G. A. LYON  2,426,627
WHEEL COVER
Filed Jan. 8, 1945
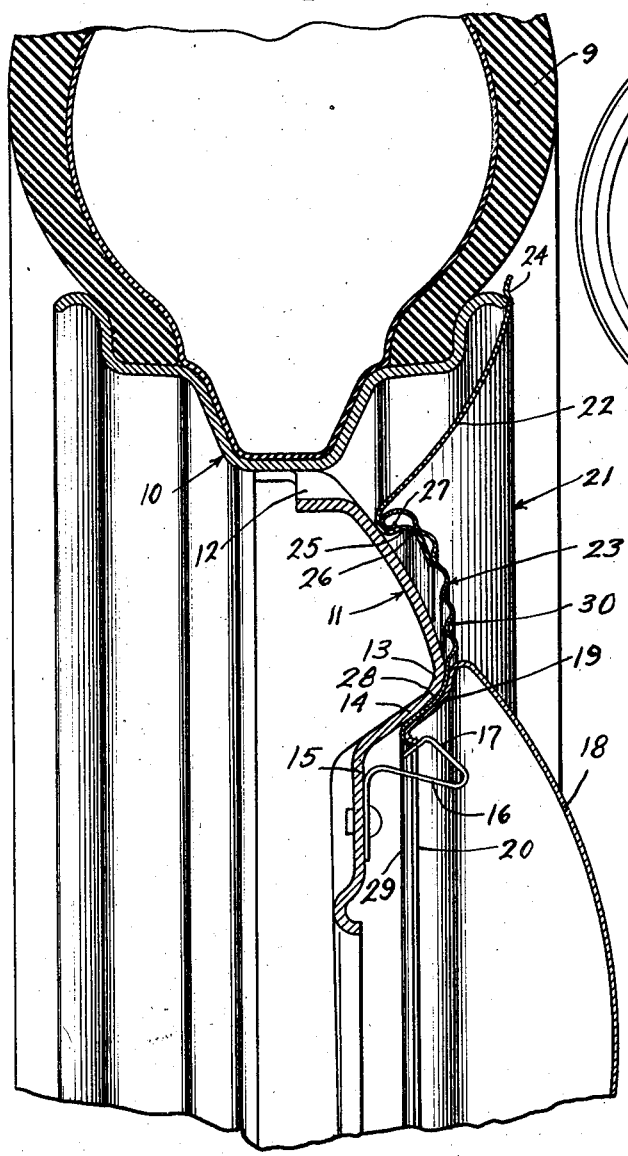
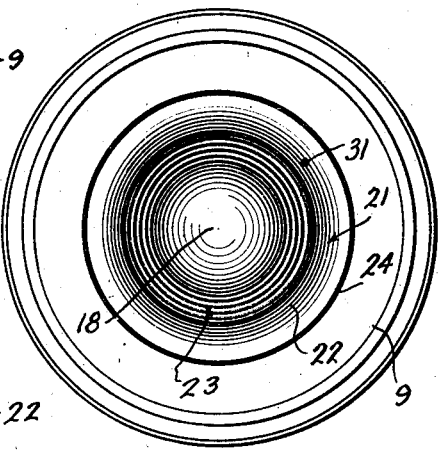
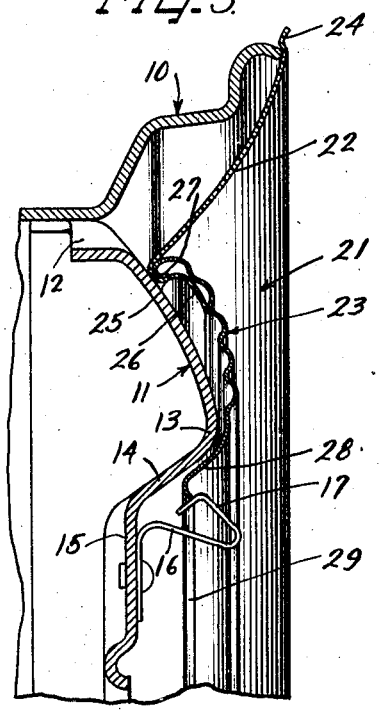
Inventor
GEORGE ALBERT LYON
by The Firm of Charles W. Hills
Attys.

Patented Sept. 2, 1947

2,426,627

UNITED STATES PATENT OFFICE 2,426,627

WHEEL COVER

George Albert Lyon, Allenhurst, N. J.

Application January 8, 1945, Serial No. 571,854

6 Claims. (Cl. 301—37)

This invention relates to a wheel structure and more particularly to a composite wheel cover for a wheel of the type having a drop center tire rim and a dished body member.

An object of this invention is to provide a highly ornamental multiple part wheel cover wherein the parts are interrelated in a novel and unique way to effect a progressive stressing of separate portions of the cover.

Still another object of this invention is to provide a wheel cover which will better accommodate manufacturing variations in the rim and body parts of the wheel.

A further object of the invention relates to the provision of a multiple part cover wherein an inner part retains an outer part on the wheel under tension and wherein the inner part may be detachably held on the wheel by the usual snap-on hub cap.

In accordance with the general features of this invention, there is provided in a cover structure for a wheel including multiple flange tire rim and body members, a composite wheel cover having an outer section for substantially covering exposed side flanges of the rim member and a radially inner section for covering at least a portion of the body member, the inner section having an inner margin arranged to be detachably engaged by a hub cap in such a manner that the hub cap first presses the inner portion of the outer section under tension against the body member and thereafter presses the inner portion of the inner section under stress against the body member.

Still another feature of the invention relates in the provision of a novel structure for interconnecting the adjoining portions of concentric cover sections.

Yet another feature of the invention relates in the provision of a novel multiple section cover wherein one section has its outer and inner margins arranged to be resiliently stressed and also has an intermediate portion which is so constructed as to rigidify the section.

Other objects and features of the invention will more fully appear from the following detail description taken in connection with the accompanying drawings which illustrate a single embodiment thereof and in which Figure 1 is a side view of a cover structure constructed in accordance with the features of this invention and showing the same applied to a wheel;

Figure 2 is an enlarged fragmentary radial cross-sectional view through the cover and wheel assembly of Figure 1; and Figure 3 is a fragmentary cross-sectional view similar to Figure 2 but illustrating the condition of the cover prior to the introduction of a hub cap in the center of the same.

As shown on the drawings:

The reference character 9 designates generally a conventional pneumatic tire and tube of the type commonly used on automobiles. The beads of this tire 9 are fitted in the flanges of the conventional type of drop center tire rim. This rim as is well known in the art has stepped flanges interconnected by a base flange.

The rim member is carried by the usual wheel body or spider member 11 which is of a dished construction and may comprise a metallic stamping.

The outer margin of this body member 11 is attached at spaced intervals to the base flange of the tire rim 10 leaving spaced wheel openings 12.

The body member 11 includes a curved nose portion 13 terminating radially inwardly and the dished flange portion 14 in turn terminates in a substantially axial bolt-on flange portion 15. This portion 15 as is well known in the art is adapted to be secured to a part on an axle by means of bolts or cap screws (not shown).

As is also well known in the art access is had to the bolts and cap screws by removing a central hub cap 18. The hub cap 18 is detachably retained on the wheel by means of a plurality of spring clips 16 which may be of any suitable number such, for example, as three or five. These spring clips are of the type referred to in the art as an inverted type clip and each of them embodies a loop-like portion 17 turned back upon the clip so as to provide a resilient free extremity for engagement with the hub cap.

The hub cap 18 comprises a hollow metallic fabrication including an underturned annular skirt 19 terminating in a turned edge 20 adapted to be cammed over the extremities 17 of the spring clips for retaining the hub cap 18 on the wheel.

As is well known in the art, these spring clips permit of a so-called easy-on hard-off action. By that is meant the fact that the hub cap is easier to press into retained position than it is to remove it. As a consequence, in order to remove the hub cap it is the practice to use a suitable pry-off tool such as a screw driver for forcibly ejecting it from its retained cooperation with the spring clips.

Now it is the aim of this invention to provide a new multiple part cover designated generally by the reference character 21 which can be retained on the wheel by the central hub cap 18. The cover of my invention comprises a plurality of sections 22 and 23 which are concentrically arranged in diverging relationship. The radially outer section 22 is of channeled convex curved cross-section and terminates in an offset outer end portion 24 adapted to overhang an edge of the tire rim in close proximity to the tire. The inner margin of this section 22 is turned slightly at 25, thus forming a curled or beaded inner margin which is adapted to cooperate with the radially inner section 23.

It will be perceived that the turned portion 25 terminates in an inclined portion 26 which underlies the section 23.

The inner section 23 has a turned outer edge 27 of such configuration as to nest in the turned portion 25, whereby the two sections are interlocked in nested relationship.

The section 23 has its radially inner margin 28 turned radially and axially rearwardly so as to telescope the wheel body portion 14 and terminates in a turned edge 29. The intermediate portion of the section 23 is corrugated so as to rigidify it between its two turned margins 27 and 28.

The outer section may be made of any suitable material but I find it desirable to make it of a synthetic plastic such as ethyl cellulose. Moreover by reason of the particular configuration of the section 22 and the angular relationship of it to the wheel it in use appears to constitute a continuation of the side wall of the tire 9. By giving the outer surface of this section 22 a white finish I am enabled to cause this section to appear to constitute a white side wall portion of the tire. This is highly advantageous since it gives the effect of the tire being a massive one as well as one wherein the tire appears to extend clear down to the wheel body member 11.

The intermediate section 23 may be made of any suitable sheet material such, for example, as stainless steel and may have a high lustrous external finish. As an alternative, the external surface of the section 23 may be given a colored finish such, for example, as the same color as is used on the automobile body. This will enable a highly desirable contrasting color effect in the cover, particularly with relation to the tire and the lustrous central hub cap 18.

Normally the inner margin 28 of the section 23 is so located as to be slightly spaced (Figure 3) from the nose 13 of the body member 11. I purposely make the section 23 of this configuration and dimension so that if there is any variation in the relative positions of the nose 13 of the wheel body and the outer edge of the rim 11, such variation can be readily accommodated by the cover 21.

In addition in applying the cover 21 to the wheel it is first initially aligned with the wheel and is then pressed axially toward the wheel until its outer edge 24 is brought to bear against the edge of the rim. During this application of the cover the inner edge 29 thereof is cammed over the outer extremities 17 of the spring clips to a position wherein it is temporarily retained on the wheel by the spring clips. I have illustrated this position of the wheel cover in Figure 3.

Thereafter the hub cap 18 is aligned with the center of the wheel and is pressed axially home against the wheel body member 11. During this application of the cover member it engages the turned portion 28 subjecting it to pressure which results in the outer margin 27 of section 23 stressing the inner edge 25 of the flexible section 22 until that edge is brought tightly against the outer surface of the body member 11. Continued movement of the hub cap results in the lateral deflection of the portion 28 of the inner section 23 until the same is brought into tight cooperation with the central portion 14 of the wheel body member. This insures a tight cooperation of the wheel cover 21 with the wheel body member and with the outer edge of the wheel rim. Attention is directed to the fact that the plastic section 22 while self-sustaining as to form is inherently resilient or pliable so that it may be stressed or deflected into tight cooperation with the wheel body member. This is also true to a minor extent of the sheet metal section 23 which is inherently resilient and can be resiliently deflected into engagement with the central part 14 of the wheel body member. By corrugating the intermediate portion of the ring section 23 I am enabled to rigidify it between its outer and inner resilient marginal portions.

If it is so desired, the outer section 22 may be provided with a hole 31 through which an end of the valve stem may project. The resiliency of the material of the section 22 permits of a slight indentation of the same to afford greater access to the valve stem without the necessity of removing the wheel cover. However, if a short valve stem is employed, which does not project through the section 22, then access may be had to such stem by resiliently deflecting the outer portion of the section 22 away from the wheel to an extent sufficient to permit of the application of a hose nozzle to the valve stem. These features are optional and have been fully covered in issued patents granted to me of which the principal one is 2,368,254, issued January 30, 1945.

I claim as my invention:

1. As a composite article of manufacture, a wheel cover comprising a plurality of concentric circular channeled sections interlocked at their junction by one being nested in the other, the outer section being made of resiliently pliable plastic material and having a turned inner portion providing a reentrant axially outwardly opening groove, the inner section being made of more rigid material such as resilient sheet metal and having a turned outer portion nested in the turned inner portion of the outer section for applying pressure to the outer section to stress the same in use in a wheel, said inner section also having an axially rearwardly extending end portion resiliently deflectable axially when subjected to pressure for accommodating manufacturing variations in the wheel.

2. As a composite article of manufacture, a wheel cover comprising a plurality of concentric circular channeled sections interlocked at their junction by one being nested in the other, the outer section being made of resiliently pliable plastic material and having a turned inner portion providing a reentrant axially outwardly opening groove, the inner section being made of more rigid material such as resilient sheet metal and having a turned outer portion nested in the turned inner portion of the outer section for applying pressure to the outer section to stress the same in use on a wheel, said inner section also having an axially rearwardly extending end portion resiliently deflectable axially when subjected to pressure for accommodating manufacturing variations in the wheel, said inner cover section having its intermediate portion between its outer and inner portions corrugated to augment the rigidity of the intermediate portion.

3. In a cover structure for a wheel including multi-flange tire rim and body members, a wheel cover therefor comprising a plurality of circular channeled sections interlocked at their junction by one being nested in the other, the outer section having an outer margin for bearing against the edge of the rim member and extending axially and radially inwardly therefrom to said junction over the body member, said outer section having its inner marginal portion formed to provide an axially outwardly opening groove within which the outer edge portion of the inner section is received in nested relation, the inner section extending from said junction over the body member and having an inner portion turned generally rearwardly for telescoping cooperation with the center of the body member, and a hub cap independent of said inner section detachably held on the center of the body member and resiliently clamping said inner portion of the inner section under stress against the body member, the stressing of said inner section being such that the inner portion of the outer section is first tightly forced under pressure against the body member, and the inner turned portion of the inner section is thereafter clamped tightly against the body member.

4. In a cover structure for a wheel including multi-flange tire rim and body members, a composite wheel cover including an outer section for substantially covering exposed side flanges of the rim member and a radially inner section for covering at least a portion of the body member, said inner and outer sections being so convoluted and interrelated that when initially applied to the wheel only the outer portion of the outer section fully engages with the wheel at the tire rim while the inner portion of the outer section and the outer portion of the inner section tend to remain out of or to draw away from the wheel body and the inner portion of the inner section lies in spaced relation to the wheel body, and a hub cap detachably engageable with the inner section and detachably held on the center of the body member and arranged to so stress the inner section that it first presses the inner portion of the outer section under tension against the body member and then presses the inner portion of the outer section into clamped stressed contact with the body member.

5. In a cover structure for a wheel including multi-flange tire rim and body members, a composite wheel cover including an outer section for substantially covering the exposed side flanges of the rim member and a radially inner section for covering at least a portion of the body member, and a hub cap detachably held on the center of the body member and arranged to enter into detachable slidable retaining engagement with the inner portion of the inner section and in such engagement to so stress the inner section that it first presses the inner portion of the outer section under tension against the body member and whereby the inner portion of the outer section is thereafter clamped under stress against the body member, the inner portion of said inner section having a generally axially outwardly opening hook shape and the inner edge of the hub cap being beaded and arranged to interhook with said hooked inner portion in pressing said inner portion against the body member and the interhooked relationship acting to resist drawing of the tensioned inner member resiliently away from the pressed position between the hub cap and the body member.

6. In a wheel structure including a tire rim and a load-sustaining body member including an axially outwardly protruding annular nose portion defining an axially inwardly depressed bolt-on area, a cover assembly including inner and outer divergently related annular sections, and a hub cap including a flange portion arranged to be telescopically assembled with the radially inner side of said body nose portion, said outer section being adapted at its outer portion to engage the tire rim and having its inner portion formed to provide an axially outwardly opening reentrant annular groove, said inner section having its outer edge portion nested in said groove and having its inner portion configurated to telescope with the radially inner side of said body nose portion and to be pressed against said body nose portion by said hub cap flange, the inner edge of said inner portion of said inner section being turned to provide a hook structure adapted to be engaged by the inner edge of said hub cap flange, the construction and arrangement of the annular cover sections being such that when initially applied to the wheel, the grooved inner portion of the outer section and the inner portion of the inner section tend to remain out of engagement with the wheel but are driven toward and into engagement with the wheel by pressing of the hub cap into assembled relation with the wheel and the inter-hooked relationship of the hub cap and the inner portion of the inner section avoid resilient withdrawal of the inner portion of the inner section from the pressed assembled relationship between the nose portion of the body and the hub cap.

GEORGE ALBERT LYON.

REFERENCES CITED

The following references are of record in the file of this patent:

UNITED STATES PATENTS

| Number | Name | Date |
| --- | --- | --- |
| 1,234,387 | Pugh et al. | July 24, 1917 |
| 2,190,669 | Lyon | Feb. 20, 1940 |
| 2,306,631 | Lyon | Dec. 29, 1942 |
| 2,326,788 | Lyon | Aug. 17, 1943 |